United States Patent
Sanford, Jr.

[11] Patent Number: 6,055,931
[45] Date of Patent: May 2, 2000

[54] CLOG RESISTANT AIR VENT PLUG FOR TEATCUP LINER

[75] Inventor: Scott A. Sanford, Jr., Oregon, Wis.

[73] Assignee: DEC International, Inc., Madison, Wis.

[21] Appl. No.: 09/170,772

[22] Filed: Oct. 13, 1998

[51] Int. Cl.[7] ....................................... A01J 5/04
[52] U.S. Cl. ..................... 119/14.36; 119/14.47
[58] Field of Search .............. 119/14.47, 14.48, 119/14.49, 14.5, 14.51, 14.52, 14.53, 14.36

[56] References Cited

U.S. PATENT DOCUMENTS

| | | | |
|---|---|---|---|
| 488,282 | 12/1892 | Mehring | 119/14.47 |
| 3,476,085 | 11/1969 | Noorlander | 119/14.49 |
| 3,659,558 | 5/1972 | Noorlander | 119/14.52 |
| 3,967,586 | 7/1976 | Noorlander | 119/14.49 |
| 3,967,587 | 7/1976 | Noorlander | 119/14.52 |
| 4,269,143 | 5/1981 | Erbach | 119/14.49 |
| 4,303,038 | 12/1981 | Thompson et al. | 119/14.36 |
| 4,452,177 | 6/1984 | Plett | 119/14.47 |
| 4,530,307 | 7/1985 | Thompson | 119/14.49 |
| 4,537,152 | 8/1985 | Thompson | 119/14.54 |
| 5,161,482 | 11/1992 | Griffin | 119/14.47 |
| 5,178,095 | 1/1993 | Mein | 119/14.47 |
| 5,218,924 | 6/1993 | Thompson et al. | 119/14.41 |
| 5,291,853 | 3/1994 | Steingraber et al. | 119/14.54 |

*Primary Examiner*—Peter M. Poon
*Assistant Examiner*—Elizabeth Shaw
*Attorney, Agent, or Firm*—Andrus, Sceales, Starke & Sawall

[57] ABSTRACT

An air vent plug (70, 90, 94) is provided for insertion through the wall (12) of the milk tube portion (14) of a teatcup liner (16) used with a teatcup assembly (18) for milking a mammal (20). The air vent plug has an outer flange (72) exterior of and engaging the outer surface of the liner, a barrel (74) extending through the wall of the liner, an inner tip (76) interior of the liner, and a vent passage (78) extending from the outer flange inwardly through the barrel and the inner tip. The vent passage has a first calibrated diameter (80) at the outer face, and a second larger formed diameter (82) inwardly thereof. The different diameters meet at a transition shoulder (84) which faces away from the air inlet opening (87).

16 Claims, 2 Drawing Sheets

1

CLOG RESISTANT AIR VENT PLUG FOR TEATCUP LINER

BACKGROUND AND SUMMARY OF THE INVENTION

The invention relates to a teatcup assembly for milking a mammal, and more particularly to a teatcup liner with a clog resistant air vent plug.

Teatcup assemblies having a liner with an air vent plug are known in the prior art, for example U.S. Pat. Nos. 3,476,085, 3,659,558, 3,967,586, 3,967,587, 4,303,038, all incorporated herein by reference. A plurality of teatcups are connected to respective teats depending from the udder of a mammal such as a cow. Each teatcup assembly has a teatcup liner or inflation around a respective teat and defining a milk flow passage within the liner below the teat, and a pulsation chamber outside the liner between the liner and the teatcup shell, all as known in the prior art, for example U.S. Pat. Nos. 4,269,143, 4,530,307, 5,178,095, 5,218,924, all incorporated herein by reference. The system has a milking cycle with an on portion and an off portion. Milk flows from the teat towards a milking claw during the on portion, and then to a storage vessel. During the off portion, the liner is collapsed around the teat, to aid in the circulation of body fluids. Vacuum is continuously applied to the milk flow passage within the liner. Vacuum is alternately and cyclically applied to the pulsation chamber between the liner and the teatcup shell, to open and close the liner, all as is known.

The air vent plug has a calibrated vent or air port therein open to atmospheric pressure for admitting air to the upper end of the milk tube portion of the liner below the teatcup shell. As the liner opens during the milking phase on portion of the cycle, milk flows from the teat into the liner. During the off portion of the cycle, the liner is collapsed and closed. During the on portion of the cycle, the liner is open. The opening movement of the liner causes a reduction in the pressure within the liner, and the milk remaining in the liner from the previous cycle will suck backwards or be forced upwardly into the reduced pressure area around the teat end. This backwash of milk is undesirable. The noted air vent plug solves this problem by admitting a calibrated amount of air into the liner to enable the milk to be rapidly carried away from the teat end, and prevent the liner from acting like a suction pump.

The present invention provides an improved air vent plug. In one particularly desirable aspect, the invention overcomes clogging problems in prior air vent plugs, while retaining cost efficient manufacturability.

DETAILED DESCRIPTION OF THE INVENTION

Figure 1:
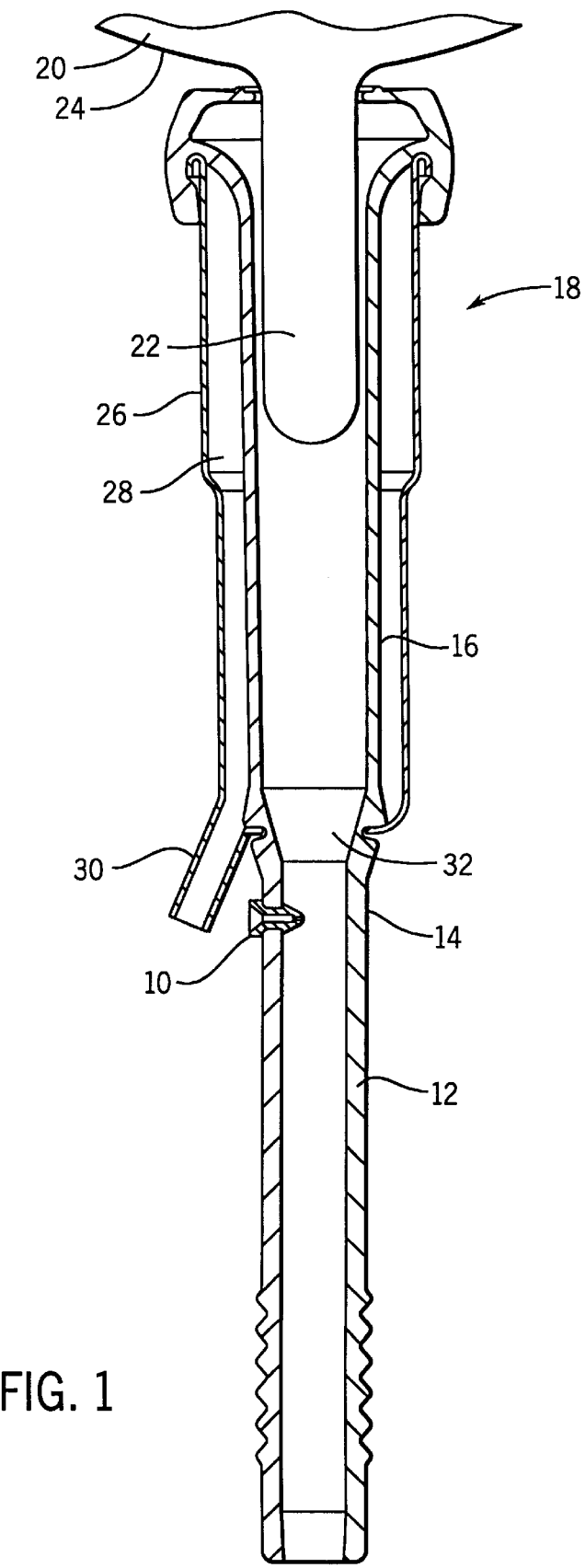
FIG. 1 is a side view partially in section of a teatcup assembly for milking a mammal.

FIG. 1 shows an air vent plug 10 inserted through the wall 12 of the milk tube portion 14 of a teatcup liner 16 used with a teatcup assembly 18 for milking a mammal 20 such as a cow. Teat 22 depending from udder 24 of the mammal extends into the liner. Teatcup shell 26 is typically a metal member defining an annular pulsation chamber 28 around liner 16 between the liner and the teatcup shell and having a pulsation port 30 for connection to a pulsator valve, as is known. Liner 16 is typically rubber or other flexible material. The lower end of milk tube portion 14 of the liner is connected to a claw, for example U.S. Pat. Nos. 4,537,152, 5,291,853, incorporated herein by reference, which in turn supplies milk to a storage vessel. As above noted, vacuum is continuously applied to milk passage 32 within the liner through milk tube portion 14, and vacuum is alternately and cyclically applied to pulsation chamber 28 through port 30, to open and close liner 16 below teat 22, all as is known and for which further reference may be had to the above noted incorporated patents.

Various types of air vent plugs 10 are known in the prior art. One type is shown at 40 in FIG. 2. Plug 40 has an outer flange 42 exterior of and engaging the outer surface of teatcup liner 16, a barrel 44 extending through wall 12 of the liner, and an inner tip 46 interior of the liner. Lip 48 engages the outer surface of the liner wall and limits depth of insertion of the plug. Lip 50 engages the inner surface of the liner sidewall and locks the air vent plug in place and prevents unintentional removal thereof. The outer face 52 of the air vent plug is dished inwardly to a concave shape. The air vent plug has a vent passage 54 therethrough of calibrated diameter, preferably 0.022 inch, to meter a desired amount of air into the interior of liner 16. This small diameter size presents manufacturing difficulties because plug 40 is a plastic member, and passage 54 is formed during the molding process. The long thin passage 54 is formed by a long thin rod in the mold, and it is difficult to maintain dimensional calibration stability. Alternatively, passage 54 is drilled with a long thin drill bit in a secondary operation. This alternative is objectionable because of the added manufacturing costs.

Figure 3:
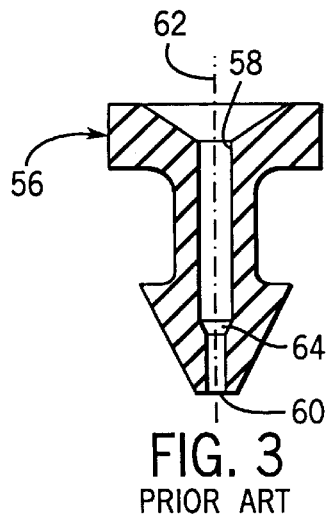
FIG. 3 is a sectional view of another air vent plug known in the prior art.

FIG. 3 shows an air vent plug 56 known in the prior art and solving the manufacturing objection noted in conjunction with plug 40. Plug 56 has a larger diametered vent passage 58 and a smaller diametered calibrated vent passage 60, both formed during the molding process. A thicker rod in the mold may be used for passage 58 than for passage 54. A thin rod in the mold is used for passage 60, however, since the smaller diameter hole at 60 does not extend the entire axial length of the plug along axis 62, it is easier to maintain dimensional calibration stability of such shortened thin rod.

Figure 2:
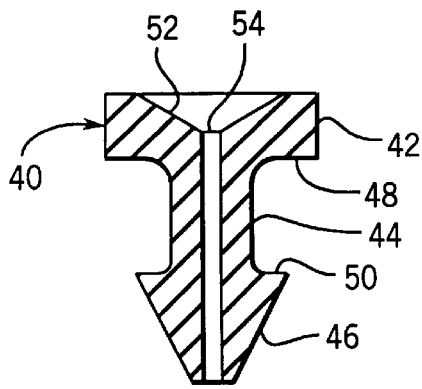
FIG. 2 is a sectional view of an air vent plug known in the prior art for insertion through the wall of teatcup liner used in a teatcup assembly such as in FIG. 1.

Vent plugs 40 and 56 of FIGS. 2 and 3 have been found to be subject to clogging problems. In a field report from a sample test farm, half of the FIG. 3 style air vent plugs were clogged after five weeks of use. Dirt is funneled into the air vent passage and clogs same. A blast of water from a cleaning hose by the milking attendant actually flushes debris into the air vent passage. One known manner of reducing clogging of the air vent passage is to eliminate the concave dish on the end face of the vent plug and instead provide a convex or dome shaped outer face, for example as shown in U.S. Pat. No. 3,476,085. The latter patent does not solve clogging at the shoulder such as 64, FIG. 3, within the air vent passage because the reduced diameter section of such passage is at the interior tip, as shown at 11 in FIG. 1 of the '085 patent.

Figure 4:
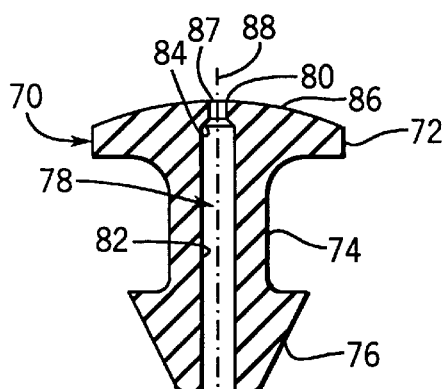
FIG. 4 is sectional view of an air vent plug constructed in accordance with the resent invention.

FIG. 4 shows an air vent plug 70 for insertion through the wall 12 of milk tube portion 14 of teatcup liner 16 used with a teatcup assembly 18 for milking a mammal. Plug 70 is one embodiment of plug 10 of FIG. 1. Air vent plug 70 has an outer portion provided by an outer flange 72 exterior of and engaging the outer surface of liner 16, a barrel 74 extending through wall 12 of the liner, and an inner portion provided by inner tip 76 interior of the liner. The plug has a vent passage 78 extending from the outer portion inwardly through the inner portion. The vent passage has a first diameter 80 at the outer portion, and a second diameter 82 inwardly thereof and larger than the first diameter. The portions of the vent passage extending through barrel 74 and inner tip 76 are of the larger diameter. Diameter 80 transitions to diameter 82 at shoulder 84 in flange 72 exterior of the liner. Larger diameter vent passage portion 82 and smaller diameter vent passage portion 80 are formed during formation of plug 70 during the molding process. A larger rod in the mold is used for passage 78, which is desirable as noted above. A thinner rod in the mold is used for passage 80, and the shortened axial length thereof is desirable as noted above, to provide a desired dimensionally stable and accurately calibrated opening, preferably 0.018 to 0.022 inch diameter. The entire length of vent passage 78 in inner tip 76 is of the noted second larger diameter 82. The entire length of vent passage 78 in barrel 74 is of the noted second larger diameter 82. Part of the length of vent passage 78 in outer flange 72 is of the second larger diameter 82, and another part of the length of vent passage 78 in outer flange 72 is of the noted first smaller diameter 80.

The construction of FIG. 4 minimizes clogging, and is not subject to the clogging problems of the construction of FIG. 3 nor of the construction of noted U.S. Pat. No. 3,476,085 because of the elimination of shoulder 64 which traps debris like a funnel, and clogs. Clogging is further minimized by providing outer flange 72 of air vent plug 70 with a non-concave outer face 86, FIG. 4, facing away from wall 12 of liner 16.

The noted smaller first diameter 80 is at outer face 86. The outer face is spaced from wall 12 of liner 16 by the thickness of outer flange 72. Vent passage 78 has the noted first portion at 80 extending inwardly from outer face 86 to shoulder transition 84, and the noted second portion at 82 extending inwardly from shoulder transition 84 to inner tip 76. Shoulder 84 faces away from the exterior air inlet opening 87, and hence does not act as a trap for debris, in contrast to shoulder 64 in FIG. 3. The length of the noted first portion at 80 from outer face 86 to shoulder 84 is less than the thickness of outer flange 72 along axis 88. The entire length of the noted second portion of the vent passage from shoulder 84 to inner tip 76 is of the noted second smaller diameter 82.

Figure 5:
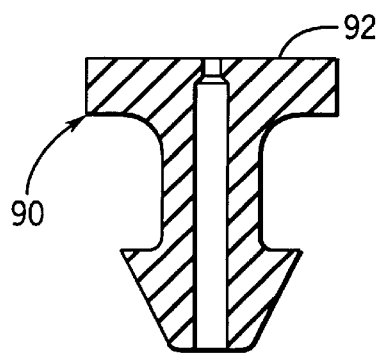
FIG. 5 is a sectional view of another embodiment of an air vent plug in accordance with the invention.

FIG. 5 shows another embodiment of an air vent plug 90, which is the same as plug 70 except that the outer face 92 is flat.

Figure 7:
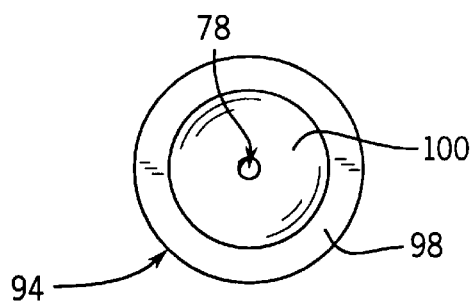
FIG. 7 is top elevation view of the air vent plug of FIG. 6.
Figure 6:
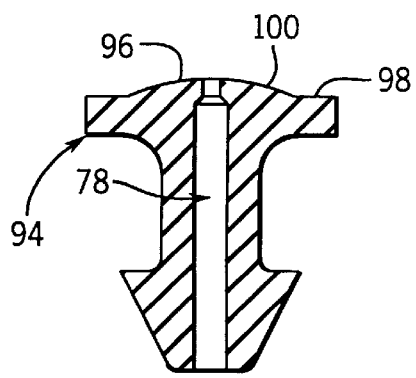
FIG. 6 is a sectional view of another embodiment of an air vent plug in accordance with the invention.

FIG. 6 shows another embodiment of an air vent plug 94 which is the same as plug 70 except that outer face 96 has an outer flat annulus 98, FIGS. 6 and 7, concentric to an inner convex domed portion 100. Vent passage 78 extends through domed portion 100.

It is recognized that various equivalents, alternatives and modifications are possible within the scope of the appended claims.

What is claimed is:

1. A teatcup assembly comprising in combination an air vent plug inserted through the wall of a teatcup liner used with the teatcup assembly for milking a mammal, said air vent plug having an outer portion exterior of said liner, an inner portion interior of said liner, and a vent passage extending from said outer portion inwardly through said inner portion, said vent passage having a first diameter at said outer portion and a second diameter inwardly thereof, said second diameter being larger than said first diameter.

2. The teatcup assembly according to claim 1 wherein said vent passage has a first portion exterior of said liner, a second portion extending through said wall of said liner, and a third portion interior of said liner, wherein said first portion has said first diameter, and said third portion has said second diameter.

3. The teatcup assembly according to claim 2 wherein said second portion has said second diameter.

4. The teatcup assembly according to claim 1 wherein:
said first diameter transitions to said second diameter at a shoulder in said vent passage;
said vent plug has an outer flange exterior of and engaging the outer surface of said liner, a barrel extending through said wall of said liner, and an inner tip interior of said liner; and
said shoulder is in said flange.

5. The teatcup assembly according to claim 4 wherein:
the entire length of said vent passage in said inner tip is of said second diameter;
the entire length of said vent passage in said barrel is of said second diameter;
part of the length of said vent passage in said outer flange is of said second diameter, and another part of the length of said vent passage in said outer flange is of said first diameter.

6. The teatcup assembly according to claim 4 wherein the outermost portion of said vent passage in the outermost portion of said outer flange is of said first diameter.

7. A teatcup assembly comprising in combination an air vent plug inserted through the wall of a teatcup liner used with the teatcup assembly for milking a mammal, said air vent plug having an outer flange exterior of and engaging the outer surface of said liner, a barrel extending through said wall of said liner, an inner tip interior of said liner, and a vent passage extending from said outer flange inwardly through said barrel and said inner tip, said outer flange having a non-concave outer face facing away from said wall of aid liner, said vent passage having a first diameter at said outer face and a second diameter inwardly thereof, said second diameter being larger than said first diameter.

8. The teatcup assembly according to claim 7 wherein said outer face is spaced from said wall of said liner by the thickness of said outer flange, said vent passage has a first portion extending from said outer face inwardly to a shoulder transition, and a second portion extending inwardly from said should transition to said inner tip, said first portion having said first diameter, said first portion having a length from said outer face to said shoulder less than said thickness of said outer flange.

9. The teatcup assembly according to claim 8 wherein the entire length of said second portion from said shoulder to said inner tip is of said second diameter.

10. The teatcup assembly according to claim 7 wherein said outer face is convex.

11. The teatcup assembly according to claim 7 wherein said outer face is flat.

12. The teatcup assembly according to claim 7 wherein said outer face has an outer flat annulus concentric to an inner convex domed portion, and wherein said vent passage extends through said domed portion.

13. A teatcup assembly comprising in combination an air vent plug inserted through the wall of a teatcup liner used with the teatcup assembly for milking a mammal, said air vent plug having an outer portion with an air inlet exterior of said liner, an inner portion interior of said liner, and a vent passage extending from said air inlet at said outer portion inwardly through said inner portion, said vent passage having a transition in diameter forming a shoulder facing away from said air inlet.

14. The teatcup assembly according to claim 13 wherein said vent passage has a first diameter on one side of said shoulder at said outer portion, and a second diameter inwardly thereof and on the other side of said shoulder, said second diameter being larger than said first diameter.

15. A teatcup assembly for milking a mammal, comprising in combination a teatcup shell, a teatcup liner in said teatcup assembly for receiving a teat, an air vent plug inserted through the wall of said teatcup liner, said air vent plug having an outer portion exterior of said liner, an inner portion interior of said liner, and a vent passage extending from said outer portion inwardly through said inner portion, said vent passage having a first diameter at said outer portion and a second diameter inwardly thereof, said second diameter being larger than said first diameter.

16. The teatcup assembly according to claim 15 wherein said air vent plug has an outer flange exterior of and engaging the outer surface of said liner, a barrel extending through said wall of said liner, an inner tip interior of said liner, and said vent passage extending from said outer flange inwardly through said barrel and said inner tip, said outer flange having a non-concave outer face facing away from said wall of said liner, said vent passage having said first diameter at said outer face and said second diameter inwardly thereof.

* * * * *